May 25, 1943.  F. G. PELLETT  2,319,780
LAMINATED MICA
Filed May 2, 1941
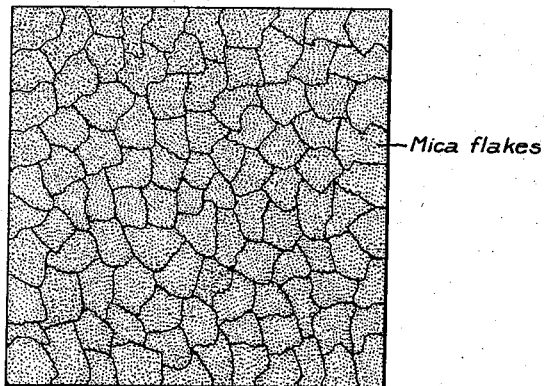
Mica flakes
Binder comprising a polyvinyl ester, alkyd resin product.
Inventor:
Fred G. Pellett,
by Harry E. Dunham
His Attorney.

Patented May 25, 1943

2,319,780

UNITED STATES PATENT OFFICE 2,319,780

LAMINATED MICA

Fred G. Pellett, Alplaus, N. Y., assignor to General Electric Company, a corporation of New York Application May 2, 1941, Serial No. 391,546

10 Claims. (Cl. 154—2.6)

The present invention relates to laminated mica insulating materials comprising mica flakes or plates bonded together by means of an improved resinous binder. It has as its principal object to provide a laminated or molded mica article from mica flakes or plates by employing an improved binder consisting essentially of the reaction product of polyvinyl acetate and an alkyd resin or the reactive components thereof.

The smooth surface of a mica splitting or flake is one to which very few adhesives will effectively adhere. However, for the production of a laminated mica article with sufficient mechanical strength to withstand satisfactorily the usual fabricating operations it is essential that the binder adhere well to the smooth surfaces of the mica flakes. In addition, the binder itself must be tough and strong. Furthermore, when the fabricated mica sheets form part or all of the insulation in an electrical machine they must not change dimensions appreciably when subjected to the combined effects of high pressures and elevated temperatures existing under actual conditions of service. Hence, the binder must be capable of curing during pressing of the mica sheets to an extent such that it will not be subject to plastic flow under such conditions. Further requirements of a mica binder are good resistance to moisture and to thermal decomposition. It is particularly important that the binder used in electrically insulating mica sheets should not form a carbon track when subjected to an electric arc.

Binders most commonly used heretofore have been shellac and alkyd resins, but these are deficient in certain of the above-mentioned properties. Shellac produces a fairly good mechanical bond and sets to a fair degree of non-plasticity, but it is deficient in heat resistance and in electrical arc resistance. The alkyd resins, on the other hand, are superior to shellac as regards heat resistance and arc resistance, but are deficient as regards the mechanical strength of the sheets so bonded. It has also been proposed in the past to bond mica with materials such as polyvinyl acetate but when used alone such materials lack adhesion to the mica surfaces, and are subject to plastic flow under heat and pressure.

I have now found that by means of my novel mica binder, laminated mica may be produced which has heat resistance and arc resistance equal to or superior to alkyd resin-bonded mica and has mechanical properties and resistance to plastic flow under heat and pressure superior to shellac-bonded mica. The binder found to possess these improved properties comprises a blended or heat-reacted mixture of polyvinyl acetate and an alkyd resin or the polyhydric alcohol-polybasic acid reactive components of such alkyd resin. One embodiment of my invention is illustrated in the accompanying drawing, wherein is shown a mica sheet comprising superimposed mica flakes bonded together with the aforementioned resinous composition used in carrying the present invention into effect. These resinous binder compositions of my invention are thermosetting and effectively wet the mica flakes to adhere tenaciously thereto. The bonded mica products are mechanically tough and strong and are superior in these respects to either unmodified alkyd resin-bonded products or polyvinyl acetate bonded products. My binders are particularly suited for the manufacture of sheet mica suitable for the production of commutator segments and the like.

In accordance with my invention, the polyvinyl acetate and the alkyd resin are heat-reacted or blended together, usually in the presence of a suitable solvent. The resultant products in the form of a solution may conveniently be applied to the mica flakes as by spraying while the flakes are being built up in the form of laminated sheets. Alternatively, a sheet of mica may be formed by first superimposing the mica flakes upon each other and then impregnating the composite sheet with the binder solution. Preferably, the flakes are coated with a solution of the binder and the solvent is removed therefrom after the flakes are assembled in sheet form.

The composite sheets of mica flakes coated with the binder are then heated in a press to a temperature sufficiently high to set or substantially set the binder. A temperature of 150° C. usually is sufficient and produces a non-fusible, insoluble, heat hardened binder. No slippage of mica fragments occurs in the final product when the binder is thoroughly cured. However, when the binder is uncured or only partly cured, substantial slippage is possible to permit the molding of various insulating parts such as commutator cones. Besides being stronger and tougher than the corresponding products made with straight alkyd resins, the sheet mica products herein described are more readily punched into small irregular shapes without damage thereto than is shellac-bonded mica. The arc and heat resistances of my product are equal to the best alkyd resin bonded materials.

The following examples in which all proportions are given in parts by weight are illustrative of the binders of my invention:

Example I

Thirty parts maleic anhydride, 20 parts pentaerythritol and 50 parts polyvinyl acetate are mixed with an equal amount of diacetone alcohol and placed in a flask provided with a reflux. All proportions herein given are by weight. The mixture is cooked for about five hours at 110° to 125° C. with constant stirring. In the resultant resin, the polyvinyl acetate apparently is chemically combined with the alkyd resin. The resinous product is mixed with twice its weight of a solvent therefor, for example, denatured alcohol, to form a varnish suitable for application to the mica flakes. Mica sheets are built up from the coated flakes by hot pressing them together in the usual manner. The finished mica sheets possess mechanical properties equal to or superior to the best shellac-bonded mica and a resistance to plastic flow under heat and pressure which is superior to that of mica sheets bonded with any material heretofore available.

Example II

Eighty parts by weight of a glyceryl phthalate resin made by cooking 2 mols of glycerine with 3 mols of phthalic anhydride to a cure of about 60'' on a 200° C. hot plate are mixed with 20 parts polyvinyl acetate in 200 parts diacetone alcohol and heated with reflux to about 130° C. for from 7 to 10 hours or until the mixture is substantially clear. More of the solvent diacetone alcohol is added from time to time to replace losses. The resulting composition is used in bonding mica as described above. Addition of polyvinyl acetate to the glyceryl phthalate in this way improves the mechanical properties therof.

Example III

One hundred parts of the glyceryl phthalate resin used in Example II, 100 parts polyvinyl acetate, 60 parts maleic anhydride and 40 parts pentaerythritol are cooked with 300 parts diacetone under the conditions given in Example I. The product, thinned if desired by the addition of more solvent, is ready for application to the mica flakes. Results are similar to Example I.

Example IV

One mol of phthalic anhydride and one mol of pentaerythritol are heated in an open container for one hour at about 200° C. About 250 grams of the resulting resin are placed in a flask with 300 grams diacetone alcohol, 90 grams maleic anhydride and 170 grams polyvinyl acetate, and the mixture is heated using a reflux for about 10 hours at from 110° to 120° C. to form an adhesive product for bonding mica. Results are similar to Example I.

Example V 21 parts of ethylene glycol, 7 parts pentaerythritol, 43 parts maleic anhydride and 28 parts of polyvinyl acetate are cooked in an open container for about 1 to 2 hours at from 175° to 200° C. A lower viscosity polyvinyl acetate may be used in the preparation of this binder as compared with the binder described in Examples I to IV. The resinous product is dissolved in a suitable solvent and applied to the mica flakes in the usual manner.

Example VI

An alkyd resin obtained by cooking 54 parts phthalic anhydride, 12 parts maleic anhydride and 33 parts pentaerythritol in an open container for about 2 hours at 150° to 180° C. is dissolved in denatured alcohol and blended cold with the toluol solution of polyvinyl acetate to produce a suitable binder. The proportions may be varied but I prefer about 70 to 80 per cent of the alkyd resin to 20 to 30 per cent of polyvinyl acetate. Mica sheets bonded with this material are mechanically stronger than corresponding sheets prepared with either of the unblended materials.

Example VII 72 parts of 3,6-endomethylene tetrahydrophthalic anhydride, i. e., the reaction product of cyclopentadiene and maleic anhydride known in the trade as "Carbic anhydride," 21 parts glycerine and 7 parts pentaerythritol are cooked in an open container for about 3 hours at from 170° to 180° C. A solution of the resulting resin is blended with a solution of polyvinyl acetate as in Example VI and then applied to the mica fragments.

Example VIII

A solution of polyvinyl acetate may be combined with alkyd resins such as are described in my copending application Serial No. 391,547, filed May 2, 1941, and assigned to the same assignee as the present invention. One such resin is that obtained by cooking two mols of maleic anhydride with one mol of pentaerythritol at about 120° to 130° C. for about 3 hours or until the cure of a fairly thick film is about 15 seconds on a 200° C. hotplate and blending the resinous product with a resinous composition obtained by continuously blowing air through a mixture of 73 parts of Carbic anhydride and 27 parts glycerine heated to about 170° to 180° C. for about 3½ to 5 hours.

The polyvinyl acetate should preferably be polymerized to such an extent that a 30% solution thereof in acetone has a viscosity of at least 1 poise at 20° C. Where manufacturing process will allow, still higher viscosities are to be preferred. Relative proportions of polyvinyl ester and alkyd resins may vary over a wide range, as shown by the examples. In general, I prefer the range of 20 to 80% polyvinyl ester, the remainder being alkyd resin, but even greater or lesser amounts may be used with overall results which are superior to those obtained with either the polyvinyl esters or alkyd resins when used alone. Other polyvinyl esters may be substituted for the polyvinyl acetate referred to in the examples. Partially hydrolyzed polyvinyl esters, such as a partially hydrolyzed polyvinyl acetate, may also be used. Similarly, the partially hydrolyzed polyvinyl esters which have been reacted with the aldehyde to form the corresponding acetal may be substituted for all or part of the polyvinyl ester and it is to be understood that the terms "polyvinyl ester" or "polyvinyl acetate" are intended to cover the partially hydrolyzed product thereof as well as the aldehyde-reacted, partially-hydrolyzed derivative.

A binder comprising, for example, a partially hydrolyzed polyvinyl acetate may be prepared as follows:

Example IX

Eighty (80) parts of a commercially available, partially hydrolyzed, polyvinyl acetate (15% hydrolyzed) is blended with 20 parts of a maleic anhydride pentaerythritol resin in the presence of sufficient denatured alcohol to form a binder solution containing 5 per cent of the blended resins. The maleic anhydride pentaerythritol resin is that obtained by heating 2 mols of the anhydride with 1 mol of pentaerythritol for about 3 hours at 130° C. Mica products containing as little as 2.5 per cent by weight of binder exhibit good punchability and good resistance to hot flow. Because of this low binder content, the electrical properties are exceptionally good.

Obviously, other polybasic acids and other polyhydric alcohols ordinarily used in the preparation of alkyd resins may also be employed. Apparently, in the heating together of the components of my resinous binder or during the pressing of the mica sheets, there is some chemical reaction between the alkyd resin or its components and the polyvinyl acetate, possibly due to the substitution of the dibasic acid for some of the acetate groups thus forming cross-linkages leading to a gel-like structure.

What I claim as new and desire to secure by Letters Patent of the United States is:

1. An electrically insulating material comprising mica flakes bonded together with a cementing agent comprising a heat blended mixture of an alkyd resin and a polyvinyl ester selected from the group consisting of polyvinyl acetate and partially hydrolyzed polyvinyl acetate, the said polyvinyl ester comprising from 20 to 80 per cent by weight of said mixture.

2. An electrically insulating material comprising fragments of mica bonded together with the heat reaction product of a mixture of ingredients comprising polyvinyl acetate, a polyhydric alcohol and a polybasic acid, the polyvinyl acetate comprising from 20 to 80 per cent by weight of said mixture.

3. A laminated structure comprising flakes of mica superimposed upon each other and secured together with the heat reaction product of a mixture of ingredients consisting of (1) a reactive polyhydric alcohol-polybasic acid mixture, the polyhydric alcohol component thereof averaging more than two hydroxyl groups per molecule, and (2) polyvinyl acetate, the said polyvinyl acetate comprising from 20 to 80 per cent by weight of said mixture.

4. A laminated mica product comprising mica fragments bonded together with a reaction product of a mixture of ingredients comprising a polyvinyl ester selected from the group consisting of polyvinyl acetate and partially hydrolyzed polyvinyl acetate, maleic anhydride and a polyhydric alcohol containing three or more hydroxyl groups per molecule, the said polyvinyl ester comprising from 20 to 80 per cent by weight of said mixture.

5. A bonded mica sheet comprising mica flakes superimposed upon each other and secured together with the reaction product of polyvinyl acetate, maleic anhydride and pentaerythritol, the said polyvinyl acetate comprising from 20 to 80 per cent by weight of said reaction product.

6. An electrically insulating material comprising mica flakes bonded together by the reaction product of from 20 to 80 per cent by weight of polyvinyl acetate and from 80 to 20 per cent by weight of an alkyd resin comprising the reaction product of 3,6-endomethylene tetrahydrophthalic anhydride and glycerine.

7. An electrically insulating material comprising mica flakes bonded together by the reaction product of from 20 to 80 per cent by weight of a polyvinyl acetate and from 80 to 20 per cent by weight of an alkyd resin consisting of a mixture of a maleic anhydride pentaerythritol reaction product and the product obtained by reacting 3,6-endomethylene tetrahydrophthalic anhydride and glycerine in the presence of air.

8. A laminated article consisting of flakes of mica bonded together with a cementing agent comprising partially hydrolyzed polyvinyl acetate and an alkyd resin, the polyhydric alcohol component of which comprises three or more hydroxyl groups, the said polyvinyl acetate comprising from 20 to 80 per cent of said cementing agent.

9. An electrically insulating material consisting of fragments of mica bonded together with a cementing agent comprising a heat blended mixture of from 20 to 80 per cent by weight of an aldehyde reaction product of a partially hydrolyzed polyvinyl acetate and from 80 to 20 per cent by weight of an alkyd resin containing as one of its reaction components a polyhydric alcohol containing three or more hydroxyl groups.

10. A laminated mica product comprising mica flakes bonded together by a resinous product obtained by heating an alkyd resin with a polyvinyl acetate in solution, the said polyvinyl acetate comprising from 20 to 80 per cent by weight of the alkyd resin-polyvinyl acetate mixture.

FRED G. PELLETT.